United States Patent
Bastide et al.

(10) Patent No.: US 9,246,867 B2
(45) Date of Patent: Jan. 26, 2016

(54) EXCLUDING RECIPIENTS OF A MESSAGE BASED ON CONTENT OF THE MESSAGE

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: Internationa Business Machines Corporation, Armonk, NY (US)

( * ) Notice: Subject to any disclaimer, the term of this patent is extended or adjusted under 35 U.S.C. 154(b) by 157 days.

(21) Appl. No.: 14/181,253

(22) Filed: Feb. 14, 2014

(65) Prior Publication Data

US 2015/0236997 A1    Aug. 20, 2015

(51) Int. Cl.
G06F 15/16    (2006.01)
*H04L 12/58*    (2006.01)
*H04L 29/06*    (2006.01)
*H04L 12/18*    (2006.01)

(52) U.S. Cl.
CPC ............ *H04L 51/32* (2013.01); *H04L 12/5855* (2013.01); *H04L 65/403* (2013.01); *H04L 12/1813* (2013.01); *H04L 12/588* (2013.01)

(58) Field of Classification Search
CPC ... H04L 51/32; H04L 65/403; H04L 12/1813; H04L 12/5855; H04L 12/588
See application file for complete search history.

(56) References Cited

U.S. PATENT DOCUMENTS

| 8,209,266 B2 | 6/2012 | Wormald et al. | |
| 8,321,519 B2 | 11/2012 | Gross | |
| 8,768,782 B1* | 7/2014 | Myslinski | 705/26.1 |
| 8,918,468 B1* | 12/2014 | Fisher et al. | 709/206 |
| 2010/0057732 A1 | 3/2010 | O'Sullivan et al. | |
| 2011/0125844 A1* | 5/2011 | Collier et al. | 709/204 |
| 2014/0172989 A1* | 6/2014 | Rubinstein et al. | 709/206 |
| 2014/0250196 A1* | 9/2014 | Joao | 709/206 |
| 2014/0304343 A1* | 10/2014 | Skiba et al. | 709/206 |
| 2015/0236997 A1* | 8/2015 | Bastide et al. | 709/206 |

OTHER PUBLICATIONS

Nakov et al., "SemEval-2013 Task 2: Sentiment Analysis in Twitter", Second Joint Conference on Lexical and Computational Semantics (*SEM), vol. 2: Seventh International Workshop on Semantic Evaluation (SemEval 2013), pp. 312-320, Jun. 14-15, 2013.

* cited by examiner

*Primary Examiner* — Michael Y Won
(74) *Attorney, Agent, or Firm* — Maeve McCarthy

(57) ABSTRACT

In an approach for excluding contacts from receiving a message within a social network environment, a computer receives a message to be sent by a first user in a social network environment and determines that content of the message includes a named user other than the first user. The computer determines one or more common contacts between the first user and the named user. Based on the determination of the named user in the message content and the one or more common contacts between the first user and the named user, the computer excludes, prior to sending the message, the named user and the one or more common contacts from receiving the message to be sent.

20 Claims, 4 Drawing Sheets

EXCLUDING RECIPIENTS OF A MESSAGE BASED ON CONTENT OF THE MESSAGE

FIELD OF INVENTION

The present invention relates generally to the field of messaging and communication, and more specifically to control of who receives a message based on content of the message.

BACKGROUND

Instant messaging, email, and social network communication provide a convenient tool for collaboration among individuals. Over time, users accumulate a list of contacts of other users with whom they have communicated in the past via instant messaging, email, chat rooms, and social network communications. The contact list may include friends, family members, co-workers, and acquaintances. Often a user may not wish for every contact on their contact list to receive every message the user sends, or the user may include content in a message that specifically refers to another contact, either in a negative or a positive way. If the user sending the message wishes to exclude a contact from receiving a message, the user can block that contact; however, mutual friends and contacts of the message sender and the contact may see the message and communicate the content to the contact.

U.S. Publication 2010/0057732 A1 by O'Sullivan, et al., discloses identifying social networks intersections in instant messaging. U.S. Publication 2010/0057732 identifies and compares one or more instant messaging contacts associated with a first instant messaging contacts list with identified one or more instant messaging contacts associated with a second instant messaging contacts list. The compared instant messaging contacts are based on one or more instant messaging contacts associated with both of the first instant messaging contacts list and the second instant messaging contacts list, and the comparison instant messaging contacts are associated with a third instant messaging contacts list. U.S. Publication 2010/0057732 identifies collaborative content associated with one or more of the comparison instant messaging contacts.

SUMMARY

Embodiments of the present invention are directed to a method, computer program product, and computer system for excluding contacts from receiving a message within a social network environment. A computer receives a message to be sent by a first user in a social network environment and determining that content of the message includes a named user other than the first user. The computer determines one or more common contacts between the first user and the named user. Based on the determination of the named user in the message content and the one or more common contacts between the first user and the named user, the computer excludes, prior to sending the message, the named user and the one or more common contacts from receiving the message to be sent.

DETAILED DESCRIPTION

Figure 1:
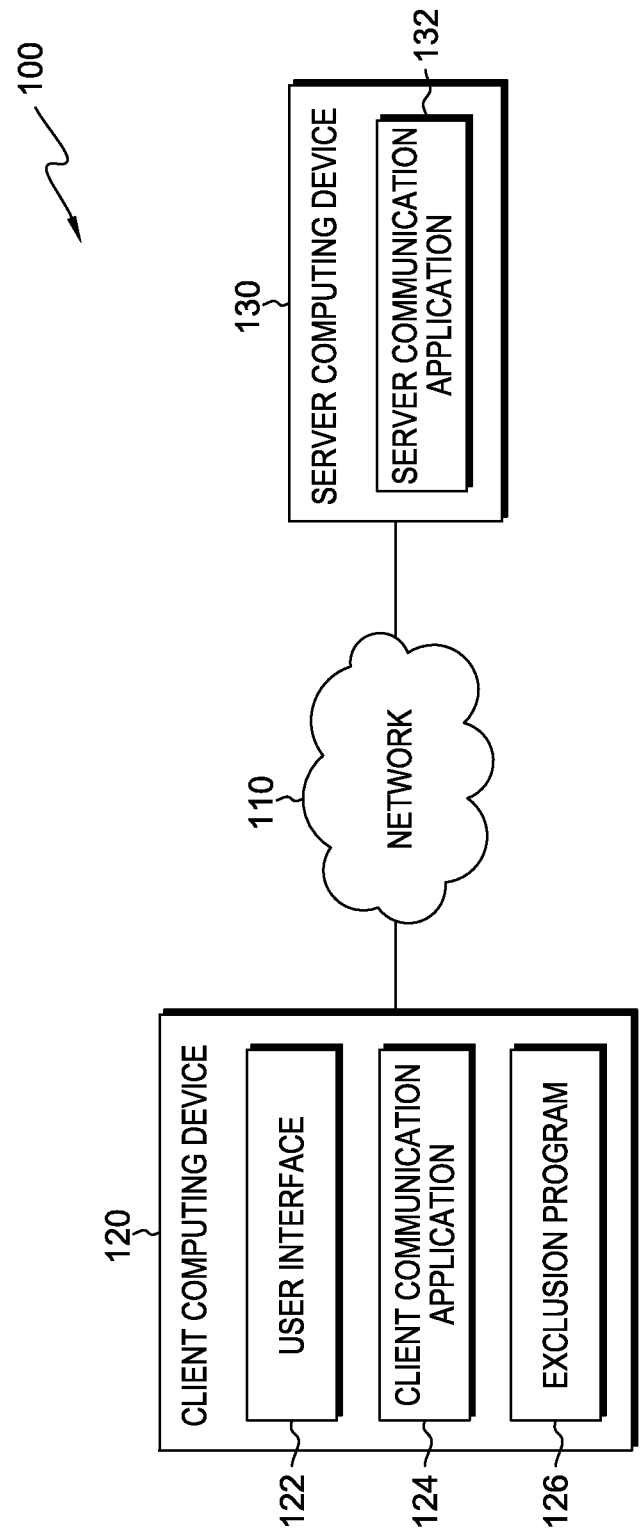
FIG. 1 is a functional block diagram illustrating a distributed data processing system, in accordance with an embodiment of the present invention.

The present invention will now be described in detail with reference to the Figures. FIG. 1 is a functional block diagram illustrating a distributed data processing system, generally designated 100, in accordance with one embodiment of the present invention. FIG. 1 provides only an illustration of one implementation and does not imply any limitations with regard to the systems and environments in which different embodiments may be implemented. Many modifications to the depicted environment may be made by those skilled in the art without departing from the scope of the invention as recited by the claims.

Distributed data processing system 100 includes client computing device 120 and server computing device 130, all interconnected via network 110. Network 110 can be, for example, a local area network (LAN), a telecommunications network, a wide area network (WAN), such as the Internet, or a combination of the three, and can include wired, wireless, or fiber optic connections. In general, network 110 can be any combination of connections and protocols that will support communications between client computing device 120 and server computing device 130, in accordance with embodiments of the present invention.

In various embodiments of the present invention, client computing device 120 may be a desktop computer, a workstation, a laptop computer, a tablet computer, a personal computer (PC), a personal digital assistant (PDA), a smart phone, or any programmable electronic device capable of communicating with server computing device 130 via network 110 and with various component and devices within distributed data processing system 100. In general, client computing device 120 represents any programmable electronic device or combination of electronic devices capable of executing machine readable program instructions and communicating with other computing devices via a network, such as network 110. Client computing device 120 includes user interface (UI) 122, client communication application 124, and exclusion program 126. Client computing device 120 may include internal and external hardware components, as depicted and described with reference to FIG. 4.

UI 122 may be, for example, a graphical user interface (GUI) or a web user interface (WUI) and can display text, documents, web browser windows, instant message applications, user options, instructions for operation, and other application interfaces. A user interface, such as UI 122, refers to the information (such as graphic, text, and sound) an application presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation.

Client communication application 124 is software capable of retrieving and presenting information obtained from the World Wide Web. In an embodiment of the present invention, a user operating client computing device 120 can view and interact with a webpage or other such information stored on a computer system, such as server computing device 130, within a computing environment and retrieved by client communication application 124, including an email application or a social network application, on UI 122.

Exclusion program 126 determines whether a message from a message sender contains reference to a specific user, either a user's name, or other identifying information. If the message contains a named user, exclusion program 126 recommends to the message sender to exclude the named user from receiving or viewing the message. Additionally, exclusion program 126 determines whether content or language contained in the message may be objectionable, for example, language that is negative in nature, refers to the named user specifically, or language that may be temporarily objectionable, such as discussing a planned proposal or a surprise party. Whether exclusion program 126 determines the message contains a named user, or whether the message content contains objectionable language, or both, exclusion program 126 determines one or more contacts that the message sender and the named user may have in common.

The "contacts" of the message sender include people with whom the message sender has previously communicated through instant messaging, email, chat rooms, social network communications, or other communication applications, or has added to a contacts list for communication based on a relationship or friendship. For example, people are added to the contacts list of the message sender when each such message is sent, provided the people are not already included in the contacts list of the message sender. The "contacts" of the named user include people with whom the named user has previously communicated through instant messaging, email, chat rooms, social network communications, or other communication applications, or has added to a contacts list for communication based on a relationship or friendship. For example, people are added to the contacts list of the named user when each such message is sent, provided the people are not already included in the contacts list of the named user. If there are any contacts in common, exclusion program 126 excludes the common contacts as recipients or viewers of the message based on the message content. In another embodiment, exclusion program 126 recommends excluding the determined common contacts, and the message sender can decide whether to exclude any of the common contacts from receiving or viewing the message. In the absence of a named user or common contacts in the content of the message, the message is sent.

Server computing device 130 may be a management server, a web server, or any other electronic device or computing system capable of receiving and sending data. In other embodiments, server computing device 130 may represent a server computing system utilizing multiple computers as a server system, such as in a cloud computing environment. In another embodiment, server computing device 130 may be a laptop computer, a tablet computer, a netbook computer, a PC, a desktop computer, a PDA, a smart phone, or any programmable electronic device capable of communicating with client computing device 120 via network 110. In another embodiment, server computing device 130 represents a computing system utilizing clustered computers and components (e.g., database server computer, application server computers, etc.) that act as a single pool of seamless resources when accessed within distributed data processing system 100.

Server computing device 130 includes server communication application 132. Server communication application 132 is an application that can provide information accessed by client communication application 124, for example, either information stored on server computing device 130, or information accessible via network 110 within distributed data processing system 100.

Figure 2:
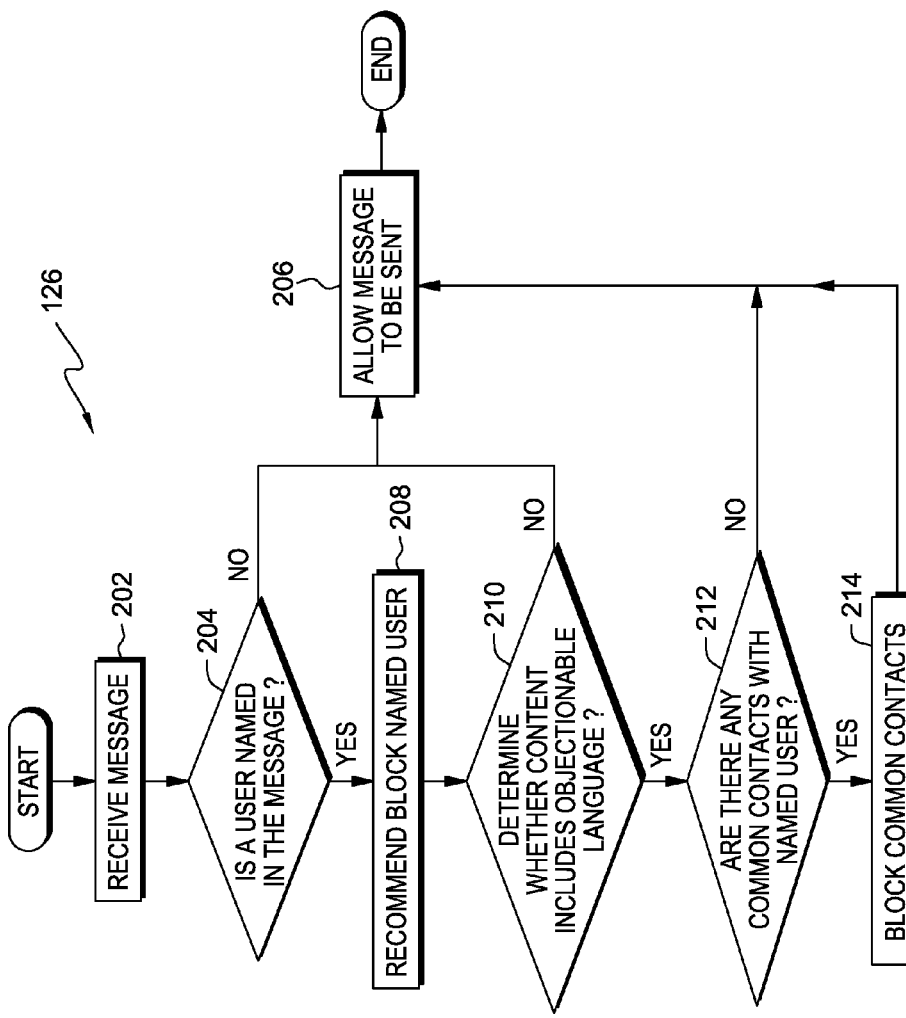
FIG. 2 is a flowchart depicting operational steps of an exclusion program for determining whether to exclude one or more common contacts with the distributed data processing system of FIG. 1 from receiving a message, based on content of the message, in accordance with an embodiment of the present invention.

FIG. 2 is a flowchart depicting operational steps of exclusion program 126 for determining whether to exclude one or more common contacts from receiving a message, based on content of the message, in accordance with an embodiment of the present invention.

Exclusion program 126 receives a message to be sent within distributed data processing system 100 (step 202). A message to be sent by a message sender operating client computing device 120 may include an email, an instant message, a social network post, or any other message or post that can be composed using client communication application 124 and communicated from a user operating client computing device 120 via network 110.

Exclusion program 126 determines whether a user is named in the message (decision block 204). Exclusion program 126 can use known textual analysis or text mining methods, for example, named entity recognition to identify named text features, such as proper nouns, dates, place names, etc., or recognition of users of the communication system, such as through a comparison of typed words to a contacts list, or by performing a search of users of the communication system based on each successive letter typed in the message, to determine whether the message contains a reference to another user, other than the message sender, such as a name, a nickname, an email address, a company name, an address, a phone number, a birth date, or other identifying information. Additionally, exclusion program 126 can determine whether the message contains an avatar or other icon, a screen name, or information that can be found in a user's profile, for example, an address book profile or a social network profile, such as likes or dislikes, favorites, current location, place of employment, previous places of employment, or previous residences. If no other user is named (decision block 204, "no" branch), exclusion program 126 allows the message to be sent (step 206). If another user is named (decision block 204, "yes" branch), exclusion program 126 recommends blocking the named user from viewing the message or excluding the named user from receiving the message (step 208). In another embodiment, exclusion program 126 analyzes message content for a reference to a second or further named user and recommends excluding any additionally named users from receiving the message.

Exclusion program 126 determines whether the message contains content that includes objectionable language (decision block 210). Exclusion program 126 uses known textual analysis methods to determine whether the message contains a negative connotation, negative terms, objectionable vocabulary, inappropriate language, or other objectionable content. In various embodiments of the present invention, a user may set predetermined criteria for objectionable language to which exclusion program 126 can compare content of the message. In other embodiments of the present invention, exclusion program 126 can analyze message content for objectionable language, including temporarily objectionable language, denoting positive connotation and positive terms, for example, a reference to a surprise birthday party. In embodiments of the present invention, exclusion program 126 uses known sentiment analysis methods in the art to determine whether a message references a negative sentiment or tone, a positive sentiment or tone, or contains only objective language. If exclusion program 126 determines the message does not contain objectionable language (decision block 210, "no" branch), exclusion program 126 allows the message to be sent (step 206). In an embodiment, exclusion program 126 analyzes message content for both reference to a named user and for objectionable language, including negative connotation.

If exclusion program 126 determines the message content includes objectionable language (decision block 210, "yes" branch), exclusion program 126 determines whether there are any common contacts between the message sender and the named user (decision block 212). If there are no common contacts with the named user (decision block 212, "no" branch), exclusion program 126 allows the message to be sent (step 206). If there are common contacts (decision block 212, "yes" branch), exclusion program 126 automatically blocks the common contacts from receiving the message (step 214) and allows the message to be sent or posted (step 206). In other embodiments, exclusion program 126 first recommends blocking the common contacts between the message sender and the named user. In another embodiment, a user sets a preference regarding whether exclusion program 126 automatically blocks determined common contacts or recommends blocking common contacts. When the common contacts are blocked, the message can be sent or posted, and the named user and the common contacts will not be able to see the message.

In various other embodiments, exclusion program 126 determines another subset of additional common contacts between the named user and the message sender based on a second, third, or further degree of relationship or connection. Exclusion program 126 can depict to the message sender further degree relationships between additional common contacts of the named user and the message sender by generating a tree diagram, a Venn diagram, or another graphic display illustrating degrees of relationships and common contacts. The degree of relationship can be configured by a message sender based on user preferences, for example, on a per message level or on all composed messages. In other embodiments, exclusion program 126 determines a probability, based on the degree of relationship between the message sender, the named user, and the additional common contacts of the named user, that the named user receives the message, or that the additional common contacts may receive the message and potentially communicate the message to the named user. In various embodiments, exclusion program 126 receives a user preference for a desired degree of relationship to be determined. Additionally, in an embodiment, exclusion program 126 may store determined degrees of relationships between the message sender and a specific named user, for example, if the message sender continuously mentions the specific named user in messages.

Figure 3:
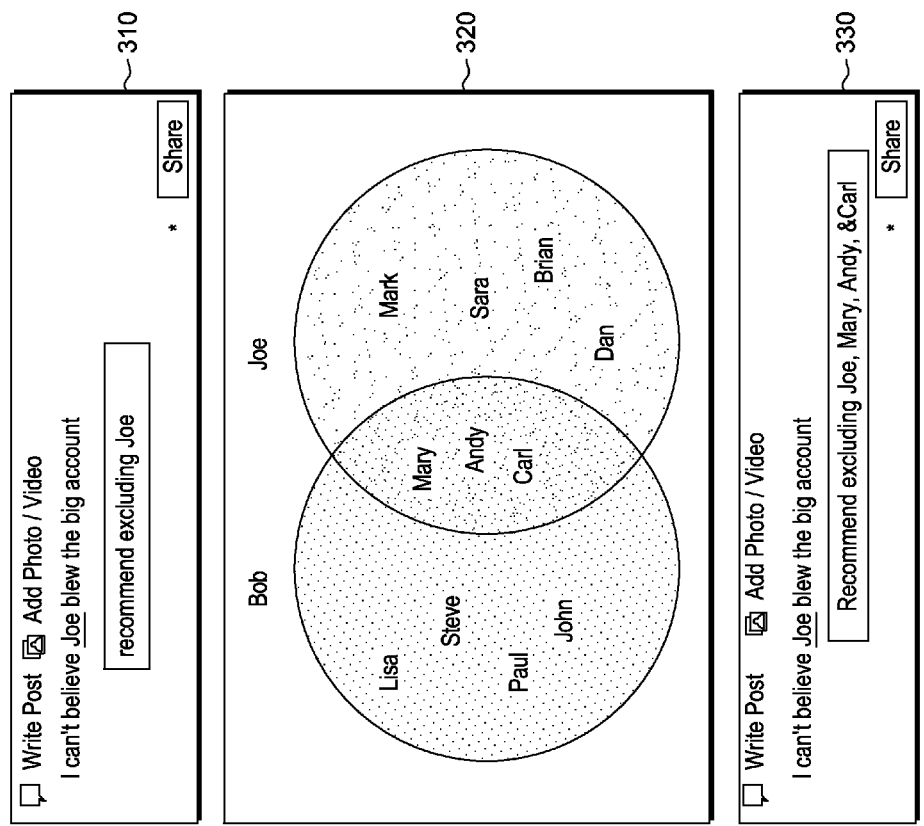
FIG. 3 illustrates an operation of the exclusion program of FIG. 2, in accordance with an embodiment of the present invention.

FIG. 3 illustrates an operation of exclusion program 126, in accordance with an embodiment of the present invention.

Display 310 depicts a message to be analyzed by exclusion program 126. Exclusion program 126 determines whether the message contains objectionable language and then whether a user has been named in the message. Exclusion program 126, upon determining a user is named in display 310, recommends blocking the named user from receiving the message. At display 320, exclusion program 126 determines common contacts between the message sender and the named user, here the message sender is 'Bob' and the named user is 'Joe'. Exclusion program 126 determines there are three common contacts, 'Mary', 'Andy', and 'Carl'. Display 330 depicts a recommendation to the message sender to exclude the named user, and the three determined common contacts prior to sending the message.

In an embodiment, exclusion program 126 can determine a subset of additional common contacts between the message sender and named user and recommend excluding the additional common contacts from receiving the message. In the example depicted in FIG. 3, 'Lisa' is connected to 'Bob', the message sender, but not to 'Joe', the named user. However, there is a chance that 'Lisa' will see 'Bob's' message referencing 'Joe' and since 'Lisa' is connected to 'Mary', 'Lisa' may tell 'Mary', who can then tell 'Joe'. Exclusion program 126 can recommend excluding 'Lisa' from receiving the message, based on the further degree of relationship between 'Mary' and 'Joe', and 'Mary' and 'Lisa'.

Figure 4:
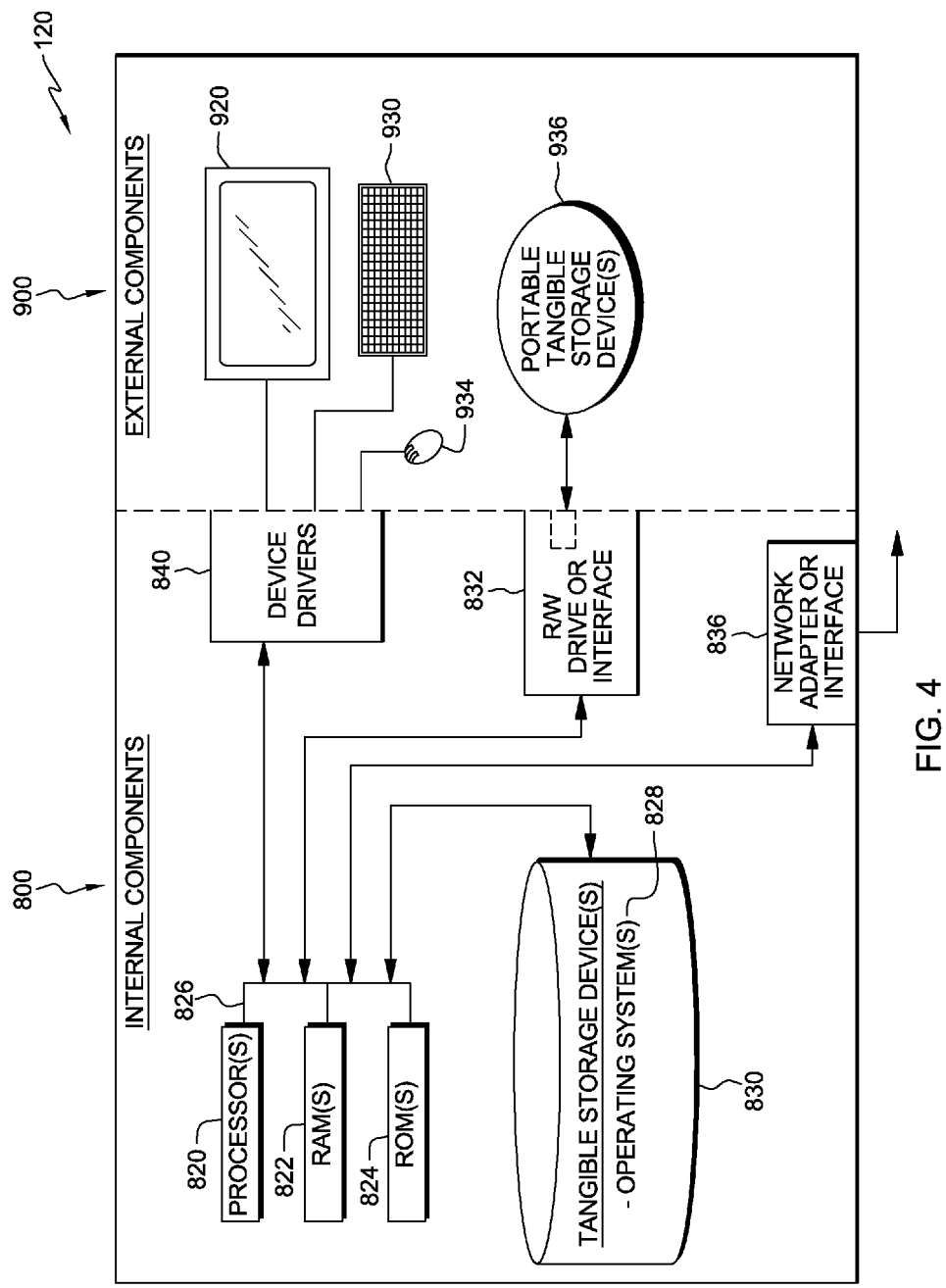
FIG. 4 depicts a block diagram of components of a data processing system, such as the client computing device of FIG. 1, in accordance with an embodiment of the present invention.

Computing/processing device client computing device 120 includes sets of internal components 800 and external components 900 illustrated in FIG. 4. Each of the sets of internal components 800 includes one or more processor(s) 820, one or more computer readable RAM(s) 822 and one or more computer readable ROM(s) 824 on one or more buses 826, one or more operating system(s) 828, and one or more computer readable tangible storage device(s) 830. The one or more operating system(s) 828, client communication application 124, and exclusion program 126 are stored on one or more of the respective computer readable tangible storage device(s) 830 for execution by one or more of the respective processor(s) 820 via one or more of the respective RAM(s) 822 (which typically include cache memory). In the illustrated embodiment, each of the computer readable tangible storage device(s) 830 is a magnetic disk storage device of an internal hard drive. Alternatively, each of the computer readable tangible storage device(s) 830 is a semiconductor storage device such as ROM(s) 824, EPROM, flash memory, or any other computer readable storage device that can store but does not transmit a computer program and digital information.

Each set of internal components 800 also includes a R/W drive or interface 832 to read from and write to one or more portable computer readable tangible storage device(s) 936 that can store but do not transmit a computer program, such as a CD-ROM, DVD, memory stick, magnetic tape, magnetic disk, optical disk, or semiconductor storage device. The programs client communication application 124 and exclusion program 126 can be stored on one or more of the respective portable computer readable tangible storage device(s) 936, read via the respective R/W drive or interface 832 and loaded into the respective hard drive or computer readable tangible storage device(s) 830. The term "computer readable tangible storage device" does not encompass signal propagation media such as copper cables, optical fibers, and wireless transmission media.

Each set of internal components 800 also includes a network adapter or interface 836 such as a TCP/IP adapter card or a wireless communication adapter (such as a 4G wireless communication adapter using OFDMA technology). The programs client communication application 124 and exclusion program 126 can be downloaded to the respective computing/processing devices from an external computer or external storage device via a network (for example, the Internet, a local area network or other, a wide area network, or a wireless network) and network adapter or interface 836. From the network adapter or interface 836, the programs are loaded into the respective hard drive or computer readable tangible storage device(s) 830. The network may comprise copper wires, optical fibers, wireless transmission, routers, firewalls, switches, gateway computers, and/or edge servers.

Each of the sets of external components 900 includes a display screen 920, a keyboard or keypad 930, and a computer mouse or touchpad 934. Each of the sets of internal components 800 also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832, and network adapter or interface 836 comprise hardware and software (stored in computer readable tangible storage device(s) 830 and/or ROM(s) 824).

The programs can be written in various programming languages (such as Java®, C+) including low-level, high-level, object-oriented or non object-oriented languages. Alternatively, the functions of the programs can be implemented in whole or in part by computer circuits and other hardware (not shown).

Based on the foregoing, a computer system, method, and computer program product have been disclosed for determining whether to recommend one or more common contacts to be excluded from receiving a message, based on content of the message. However, numerous modifications and substitutions can be made without deviating from the scope of the present invention. Therefore, the present invention has been disclosed by way of example and not limitation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for excluding contacts from receiving a message within a social network environment, the method comprising:
   a computer receiving a message to be sent by a first user in a social network environment;
   the computer determining that content of the message includes a named user other than the first user;
   the computer determining one or more common contacts between the first user and the named user; and
   based on the determination of the named user in the message content and the one or more common contacts between the first user and the named user, the computer excluding, prior to sending the message, the named user and the one or more common contacts from receiving the message to be sent.

2. The method of claim 1, further comprising:
   the computer determining that content of the message includes objectionable language, wherein the objectionable language includes at least one of: a negative connotation, a negative term, and negative content; and
   based on the determination of objectionable language in the message content, the computer recommending excluding the named user and the one or more common contacts from receiving the message to be sent.

3. The method of claim 1, wherein the computer, subsequent to determining one or more contacts between the first user and the named user, recommending excluding the one or more common contacts from receiving the message to be sent.

4. The method of claim 1, further comprising:
   the computer determining a degree of relationship among additional common contacts of the first user and the named user further than a first degree relationship; and
   the computer recommending, based on the determined degree of relationship, excluding the additional common contacts from receiving the message.

5. The method of claim 4, further comprising the computer generating a tree diagram illustrating the determined degree of relationship among the additional common contacts of the first user and the named user.

6. The method of claim 4, further comprising:
   the computer determining a probability, based on the determined degree of relationship among additional common contacts of the first user and the named user, that the named user receives the message; and
   the computer displaying the probability to the first user.

7. The method of claim 1, wherein the computer determining that content of the message includes the named user further comprises the computer determining that the content of the message includes information identifying a user.

8. A computer program product for excluding contacts from receiving a message within a social network environment, the computer program product comprising:
   one or more computer readable storage devices and program instructions stored on the one or more computer readable storage devices, the program instructions comprising:
   program instructions to receive a message to be sent by a first user in a social network environment;
   program instructions to determine that content of the message includes a named user other than the first user;
   program instructions to determine one or more common contacts between the first user and the named user; and
   based on the determination of the named user in the message content and the one or more common contacts between the first user and the named user, program instructions to exclude, prior to sending the message, the named user and the one or more common contacts from receiving the message to be sent.

9. The computer program product of claim 8, further comprising:
   program instructions to determine that content of the message includes objectionable language, wherein the objectionable language includes at least one of: a negative connotation, a negative term, and negative content; and
   based on the determination of objectionable language in the message content, program instructions to recommend excluding the named user and the one or more common contacts from receiving the message to be sent.

10. The computer program product of claim 8, wherein the program instructions, subsequent to program instructions to determine one or more contacts between the first user and the named user, recommend excluding the one or more common contacts from receiving the message to be sent.

11. The computer program product of claim 8, further comprising:
    program instructions to determine a degree of relationship among additional common contacts of the first user and the named user further than a first degree relationship; and
    program instructions to recommend, based on the determined degree of relationship, excluding the additional common contacts from receiving the message.

12. The computer program product of claim 11, further comprising program instructions to generate a tree diagram illustrating the determined degree of relationship among the additional common contacts of the first user and the named user.

13. The computer program product of claim 11, further comprising:
    program instructions to determine a probability, based on the determined degree of relationship among additional common contacts of the first user and the named user, that the named user receives the message; and
    program instructions to display the probability to the first user.

14. The computer program product of claim 8, wherein the program instructions to determine that content of the message includes the named user further comprise program instructions to determine that the content of the message includes information identifying a user.

15. A computer system for excluding contacts from receiving a message within a social network environment, the computer system comprising:
    one or more computer processors, one or more computer readable memories, one or more computer readable storage devices, and program instructions stored on the one or more computer readable storage devices for execution by the one or more computer processors via the one or more computer readable memories, the program instructions comprising:

program instructions to receive a message to be sent by a first user in a social network environment;

program instructions to determine that content of the message includes a named user other than the first user;

program instructions to determine one or more common contacts between the first user and the named user; and based on the determination of the named user in the message content and the one or more common contacts between the first user and the named user, program instructions to exclude, prior to sending the message, the named user and the one or more common contacts from receiving the message to be sent.

16. The computer system of claim 15, further comprising:
program instructions to determine that content of the message includes objectionable language, wherein the objectionable language includes at least one of: a negative connotation, a negative term, and negative content; and based on the determination of objectionable language in the message content, program instructions to recommend excluding the named user and the one or more common contacts from receiving the message to be sent.

17. The computer system of claim 15, wherein the program instructions, subsequent to program instructions to determine one or more contacts between the first user and the named user, recommend excluding the one or more common contacts from receiving the message to be sent.

18. The computer system of claim 15, further comprising:
program instructions to determine a degree of relationship among additional common contacts of the first user and the named user further than a first degree relationship; and program instructions to recommend, based on the determined degree of relationship, excluding the additional common contacts from receiving the message.

19. The computer system of claim 18, further comprising:
program instructions to determine a probability, based on the determined degree of relationship among additional common contacts of the first user and the named user, that the named user receives the message; and program instructions to display the probability to the first user.

20. The computer system of claim 15, wherein the program instructions to determine that content of the message includes the named user further comprise program instructions to determine that the content of the message includes information identifying a user.

* * * * *